April 23, 1957   H. W. DIETERT   2,789,331
METHOD AND APPARATUS FOR MAKING MOLDS USEFUL IN CASTING
Filed March 30, 1953

INVENTOR.
HARRY W. DIETERT
BY Whittemore,
Hulbert & Belknap
ATTORNEYS

INVENTOR.
HARRY W. DIETERT

United States Patent Office 2,789,331
Patented Apr. 23, 1957

2,789,331

METHOD AND APPARATUS FOR MAKING MOLDS USEFUL IN CASTING

Harry W. Dietert, Detroit, Mich., assignor to Harry W. Dietert Company, Detroit, Mich., a corporation of Michigan Application March 30, 1953, Serial No. 345,317

3 Claims. (Cl. 22—193)

The present invention relates to method and apparatus for making molds useful in casting.

It is an object of the present invention to provide method and apparatus useful in casting characterized by high accuracy of castings, reduction of cost as compared to comparable methods, its adaptability in large part to the use of standard foundry equipment, and the fact that mold sections may be produced characterized by controlled wall thickness so that relatively thin permeable walls may be provided where permitted and relatively thicker walls may be provided where required by the nature of the part.

More specifically, it is an object of the present invention to produce mold sections by employing a sand mix including a binder of drying characteristics, in conjunction with a core box carrying a pattern, and a dryer having surfaces spaced a predetermined distance from the adjacent surfaces of the pattern so as to control the wall thickness of a mold segment therebetween.

It is a further object of the present invention to provide method and apparatus for producing molds in which the mixture of sand, core oil or selected thermal setting resins, and/or additional materials may be introduced into the space between the pattern and the dryer plate by blowing, hand ramming, pneumatic ramming, jolting, or other methods.

It is a further object of the present invention to provide a method and apparatus for producing molds characterized by the rapid drying of the mold due to its thin wall section.

It is a further object of the present invention to provide a method of producing molds which comprises shaping a green core formed of a mixture of sand and core oil or selected thermal setting resins to definitely predetermined but generally relatively thin wall section, and thereafter baking the core for a relatively short period as permitted by the thinness of the core.

It is a further object of the present invention to produce a core shell mold employing a contoured dryer to form the core shell mold in two sections, in which the entire outer surface of the mold is contoured in conformity with the contour of the contoured dryers.

It is a further object of the present invention to provide a core shell mold composed of mating halves by employing contoured dryers to produce registering or mating engaging points for mating the two halves thereof.

It is a further object of the present invention to produce a core shell mold composed of two halves having planes or areas produced by corresponding planes or areas machined on contoured dryers to definite dimension for use in clamping the two halves together.

It is a further object of the present invention to provide a shell mold formed of two halves having surfaces produced by machined surfaces of contoured dryers to produce mating flange edges on the halves of the core mold.

It is a further object of the present invention to produce core molds by the use of a contoured dryer for forming the mold, including a gating system incorporated in the core mold.

It is a further object of the present invention to provide a method of producing core molds in which only one accurate core box is required.

It is a further object of the present invention to provide a method of making core molds which comprises the use of contoured dryers having accurately machined surfaces only at parting line and clamping locations of the core mold.

It is a further object of the present invention to provide a method of producing core molds in which the core box remains cold.

It is a further object of the present invention to produce shell type molds having variable and predetermined wall thickness at predetermined points to withstand expected loads and ferrostatic pressure.

It is a further object of the present invention to provide a method of producing core molds in which the sand is mixed with oil and/or water, thereby avoiding dust.

Other objects and features of the invention will become apparent as the description proceeds, especially when taken in conjunction with the accompanying drawings, wherein.

In carrying out the present invention the sand used to form the core of the shell type molds may be any sand, such for example as conventional core sand including washed and dried silica sand, crude silica sand, beach sand, river sand, bank sand, lake sand, etc. It is preferred to employ a fine sand which is washed and dried to reduce the quantity of binder used in the process. Excellent results have been obtained when the grain size of the sand is relatively fine, as for example from 80 to 150 mesh.

In carrying out the invention a core oil of drying type may be employed and this may be used with or without water, mixed with cereal and water to provide additional green strength, or employed with an oxygen releasing agent such for example as ammonium nitrate or potassium perchlorate. The oil employed may be a copolymer fast drying mineral oil which is largely or completely pre-oxidized. Excellent results have been obtained using a vegetable oil with a drier, such as linseed oil including from 2 to 10% by volume of japan drier. The oil is employed in a percentage by weight of not substantially more than 2% of the total weight of the mixed sand. The sand and core binder, together with the additional mixing ingredients if employed, may be mixed in the usual conventional manner.

Instead of oil, resins of the thermal setting type may be used as a binder, usually about ½ to 1½ % by weight. Urea- or phenol-formaldehyde resins are preferred.

While the apparatus for producing the mold is illustrated herein as designed for blowing, the invention may be carried out by ramming the sand by hand or with any pneumatic rammers, jolting or the like. However, it is preferred to employ the blowing method illustrated herein.

Figure 1:
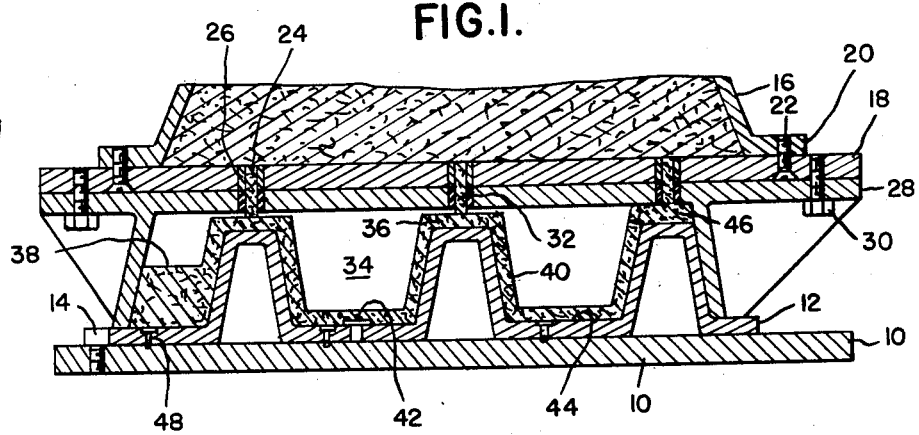
Figure 1 is a vertical section through the apparatus for producing shell type molds.

Referring now to Figure 1 the base plate of a core blower is illustrated at 10 and this base plate is normally provided with means for raising and lowering the plate. Mounted on the base plate 10 is a contoured dryer or dryer plate 12. The dryer is accurately mounted on the base plate 10 by means of suitable locator pins, one of which is illustrated at 14. It will be appreciated that the locator pin merely serves to locate the dryer on the base plate and does not prevent ready separation of the dryer from the base plate.

The apparatus includes a sand chamber 16 which contains the mixture of sand and binder and other ingredients if employed. Bolted to the underside of the sand chamber 16 is a blow plate 18, the blow plate being illustrated as secured to an outwardly extending radial flange 20 on the chamber 16 by screws 22. At appropriate places the blow plate 18 is provided with blow holes 24, which as illustrated in the figure may be provided with bushings 26.

Bolted or otherwise secured to the underside of the blow plate is a core box 27, attaching bolts being illustrated at 30. The core box is downwardly open and has its upper wall provided with blow holes 32 registering with the blow holes 24 provided in the blow plate 18. Mounted within the core box 28 is a pattern 34 which is shaped to produce the casting of the desired type and which is provided with structure indicated at 36 shaped to produce gates and which is shaped at one end, as indicated at 38, to provide a pouring basin.

The dryer 12 is contoured in comformity with the outline of the pattern to shape the core 40 as illustrated in the figure. In other words, the wall thickness of the core will be determined by the spacing at any particular point between the surface of the core and the adjacent surface of the contoured dryer. This has important advantages in that it permits an accurate control of the wall thickness of the shell type mold and also permits this wall thickness to be of predetermined dimension so as to provide increased strength where required. Thus, the ferrostatic pressure of the molten metal during the casting operation may be substantially different at different points and the wall thickness of the mold may be controlled to provide the necessary strength. This has a second important advantage in that the wall thickness at points of minimum stress may be relatively thin, thus resulting in economy of the sand. Moreover, the use of the contoured dryer provides another important advantage in that the exterior of the mold may be held to predetermined accurate dimensions, thus permitting assembly of the mold sections in supporting structure as will subsequently be described, which will hold the sections in assembled relation with a high degree of accuracy.

For this last mentioned function, the dryer may be provided with pins or pressure points 42 having machined surfaces adjacent the core so as to provide a smooth accurately located pressure point at the exterior of the core section. In such case the remaining surface of the dryer in contact with the core may be roughly finished since it does not enter into the required accuracy of the mold. Alternatively, the pins or machined elements 42 may be omitted and the surfaces 44 of the dryer may be accurately machined. Preferably, the dryer is designed to provide core space at 46 to produce outwardly extending flanges on the mold which are used in assembling the mold sections together. At 48 there are illustrated vents provided to permit the escape of air as the sand is blown into the core cavity.

Employing the apparatus illustrated in Figure 1, the core cavity is blown full of sand after which the base plate 10 is lowered, carrying the dryer plate and the contoured mold downwardly. The dryer may be readily removed from the base plate and transferred to a baking oven. Due to the relatively thin wall section of the mold and the selection of a quick drying copolymer core binder or the like, the baking time may be relatively short, as for example from six to fifteen minutes. Moreover, it will be observed that at this time the mold section is supported on the dryer, thus holding it against distortion during the baking process.

It is also pointed out that this method permits the use of a single core box and pattern in conjunction with a plurality of dryers, and that the core box is thus not subjected to the heat of the baking oven and is thereby prevented from undergoing heat distortion. Any conventional type of drying, such for example as an oven obtaining its heat from coke, coal, oil, gas, electricity, infra-red radiation, or high frequency energy may be employed.

Figure 2:
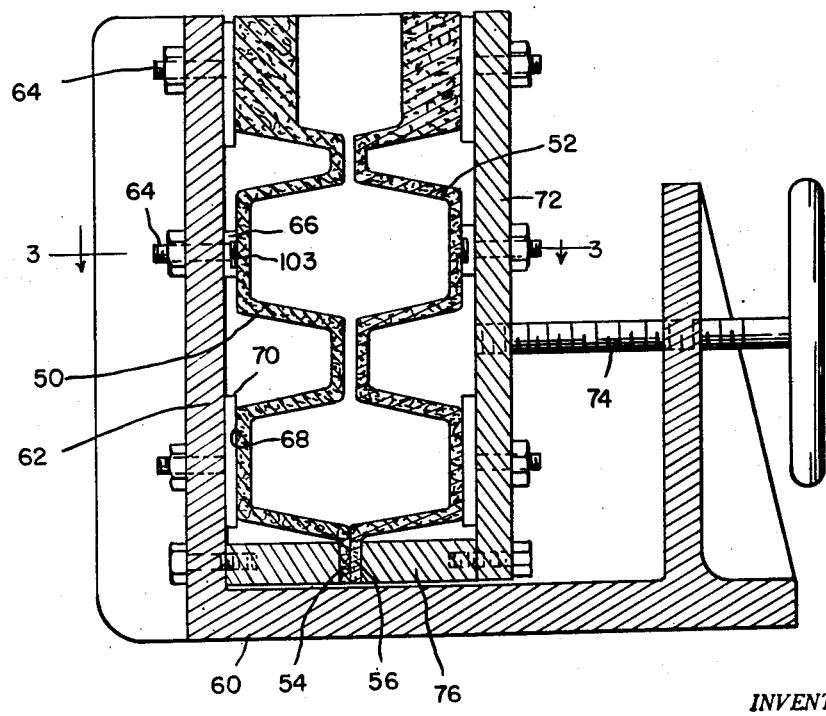
Figure 2 is a vertical section through the apparatus for holding assembled mold sections in position for pouring.
Figure 3:
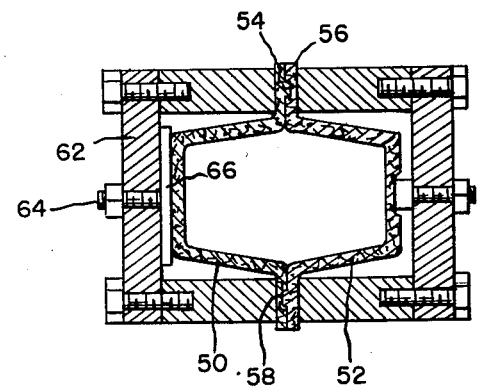
Figure 3 is a horizontal section substantially on the line 3—3, Figure 2.

In the illustrated embodiment of the present invention the mold is formed of two mold sections. As illustrated in Figures 2 and 3, these mold sections, which are designated 50 and 52, are each provided with outwardly extending matching flanges 54 and 56 respectively which extend completely around the mold sections except for parts which form the pouring basin. Preferably, the pattern or core box is so shaped as to provide interfitting male and female parts indicated generally at 58 to insure proper registartion between the mold sections.

The supporting and clamping structure for the mold sections comprises a frame 60 having an upwardly extending flange 62 adapted to engage exterior surfaces of the mold. If the exterior portions of the mold are provided with the locating surfaces produced by the pins such as illustrated at 42, the plate 62 will be provided with accurately located pressure means such as the bolt 64 having a head 66 shaped to engage the small accurate locating surface provided on the exterior of the mold.

If, as also contemplated, the exterior surface of the mold is accurately finished throughout an external area, such as indicated at 68, the flange 62 will carry a locating plate 70 shaped to engage this entire surface. Opposite the flange 62 is a movable plate 72 adapted to be moved toward the flange 62 to establish pressure between the mold halves 50 and 52. Suitable means, such for example as a screw 74 may be employed to advance the plate 72 toward the flange 62. Intermediate the flange 62 and plate 72 are provided metal strips 76 which are adapted to clamp the flanges 54 and 56 therebetween. The two half sections of the mold are thus held together in accurately located position and are accurately supported against distortion. The pour is accomplished into the pouring basin and the molten material fills the hollow portions of the mold.

Due to the relatively thin wall section of the mold the mold will have a very substantial venting power. This is true even where extremely fine sand of low specific permeability is employed to produce castings of high accuracy. This is an important feature of the present invention, since the thickness of the wall section can be carefully controlled and predetermined so as to provide adequate venting power, while at the same time the wall section may be relatively thick as required to provide the requisite strength.

Figure 4:
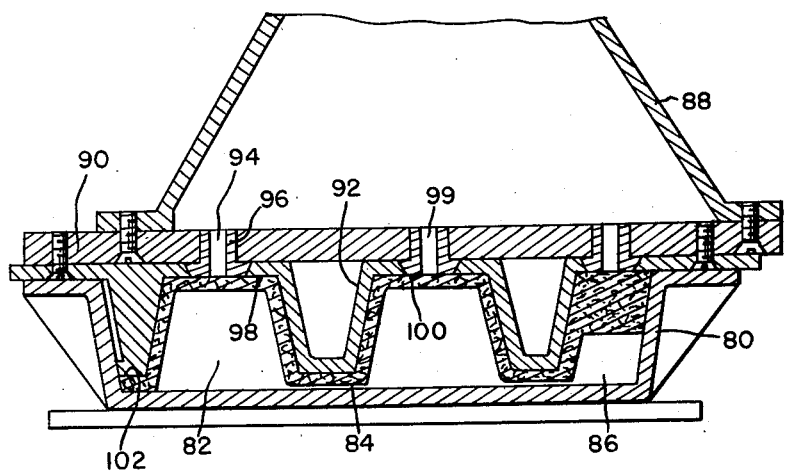
Figure 4 is a vertical section through modified apparatus for producing shell type molds.

Referring now to Figure 4 there is illustrated another embodiment of the present invention, and in particular, the apparatus for carrying out the invention. In this case the base plate 10 of the core blower has mounted thereon a core box 80 in which is located the pattern 82 shaped to provide a casting of requisite shape including portions 84 and 86 to provide the required gates and pouring basin. In this case the sand chamber 88 has bolted or otherwise secured thereto a blow plate 90. Bolted or otherwise permanently secured to the underside of the blow plate 90 is the contoured dryer or dryer plate 92. Again, the dryer is contoured to provide surfaces spaced a predetermined distance from the adjacent surfaces of the pattern and/or core box to provide a mold section of predetermined and ordinarily non-uniform wall section. The blow plate and dryer are provided with registering blow holes 94 which may be provided with bushings 96. The core engaging surface 98 of the dryer may be accurately finished to provide a smooth and accurate locating surface on the exterior of the mold section. Alternatively, a bushing, such as illustrated at 99, may be provided in the registering blow holes which includes an accurately machined locator surface 100 adapted to produce a correspondingly smooth and accurate locating surface on the exterior of the mold section. In this case the core engaging surface of the dryer need not be accurately finished except at the flange forming surfaces 102, since only the locator surfaces formed by the machined surface 100 of the bushing and the flange surfaces formed by the machined surfaces 102 of the dryer, are employed in the mold supporting structure as locating surfaces.

Where the bushing 99 is employed, the head 66 of the locating bolt 64 may be recessed as indicated at 103 in Figure 2, the recess corresponding to the opening through the bushing. It will be appreciated that the machined surface 100 is annular in shape and accordingly the head 66 will in this case be provided with a matching annular locating surface.

In the present embodiment of the present invention, the core is preferably rammed by blowing although it may be filled with other conventional methods. In any event, after the core has been formed the base plate 10 is lowered, thereby lowering the core box and pattern, together with the shaped or contoured core. This core box, pattern, and core is then transferred to a baking oven and dried as previously described in conjunction with the other embodiment of the invention.

While this embodiment of the invention requires a plurality of core boxes and patterns, and also subjects the core boxes and patterns to the heat in the baking oven, it has the advantage that the core is baked in contact with the pattern so as to provide for extreme accuracy in the finished or baked core or mold sections.

Alternatively, it will of course be obvious that the construction may be provided so that the core box, pattern, core, and contoured dryer are removed as a unit from the blower and the core baked while retained between the pattern and dryer. This is of course a slower operation but may be carried out where necessary to obtain a high degree of accuracy.

The present invention is dependent for its success upon the use of a core binder characterized by a relatively brief baking time, in conjunction with the production of a mold section having a relatively thin wall. Moreover, the invention depends upon the control of the wall thickness so as to provide a wall no thicker than required at any particular point. In prior methods the minimum required wall thickness at any particular point is provided throughout the mold with the result that at certain points in the mold the wall thickness is greatly in excess of that required. This not only is wasteful of the sand, but also reduces the venting power of the mold.

By employing special sand mixtures such for example as including cereals and water, sufficient green strength is provided in the core to insure it maintaining its shape during movement and baking. The present invention is characterized in that it provides the complete inner and outer surface of a mold section in a single operation, the entire outer surface of the mold section being provided by a contoured dryer. The invention is ordinarily practiced by producing a complete shell type mold in two mating halves which are so designed as to permit rigid clamping of the mold sections in assembled relation.

An important feature of the present invention is that the use of the contoured dryer provides exterior locating or clamping surfaces on the mold sections which may be engaged to support the two halves of the mold in assembled relation.

It is further to be observed that the present invention provides two mating halves of a shell type mold which include mating flanges providing a parting line surface for forming the edge of the core mold to stop metal.

The invention is characterized by its relatively inexpensiveness since relatively inexpensive quick drying oils may be employed. Moreover, conventional core blowing equipment may be employed. In the preferred embodiment of the invention only one accurate core box is required and this core box remains cold and thus avoids distortion as a result of heating. The contoured dryers permit the use of cast surfaces file finished in general, accurately machined only at parting line and clamping locations. The invention of course may be carried out with a conventional baking oven. Where resin binders are employed, economy results from the small quantity used, and the controlled wall thickness.

The shell core can be made of selected or determined thickness sufficient to withstand predicted loads at particular points, thus preventing mold distortion and producing greater accuracies in the cast. The castings are not warped since the core shell can be held rigid while the casting is cooling. The present invention employs a relatively less expensive core binder and requires less of the binder than other types of shell molding.

Another important advantage of the present invention is that the sand employed in the present invention is mixed with a liquid. Therefore, the sand is not dusty and the practice of the invention is therefore characterized by the absence of dust accompanying it.

In the preferred embodiment of the present invention the operator does not have to handle the relatively heavy core box, but instead is required to transport only the contoured dryer together with the shaped core, between the core blower and the oven.

Attention is directed to the fact that a single contoured dryer forms the entire exterior surface of half of a mold, the interior surface of the mold section being shaped by the pattern.

The drawings and the foregoing specification constitute a description of the improved method and apparatus for making molds useful in casting in such full, clear, concise and exact terms as to enable any person skilled in the art to practice the invention, the scope of which is indicated by the appended claims.

What I claim as my invention is:

1. The method of casting dimensionally accurate reproductions of a pattern which comprises the steps of producing a separable section shell mold and making separate sections of the mold by first making a container of a plurality of separable parts, forming interior surfaces of said container with no particular requirement for dimensional accuracy or surface finish to be spaced from adjacent pattern surfaces an amount approximately equal to the required shell mold wall thickness, providing at spaced zones on the interior surfaces of said container limited dimension control areas located spacially with approximately the accuracy required in the finished casting to form correspondingly dimensionally accurate gauging areas at spaced zones on the exterior surface of the shell mold, locating a pattern part in the assembled container, packing sand and binder into the space between the pattern part and container, separating at least one part of the container with the sand and binder therein from the pattern part and other container part, baking the sand and binder while supported by said one container part, removing the shell mold section thus produced from said one container part, assembling together the shell mold sections to produce a complete shell mold, engaging the gauging areas on the exterior surface of the shell mold with accurately located rigid support members to support the walls of the shell mold in spacially accurate positions, and pouring the casting while so supporting the shell mold sections.

2. The method as defined in claim 1 which comprises the steps of forming edge flanges on the shell mold sections, and clamping the flanges together to assemble the sections.

3. The method as defined in claim 1 which comprises providing tubular elements in one of the container parts each having an end surface exposed within the assembled container constituting one of the said dimension control areas, in which sand and binder are introduced into the container through said elements, and in which the rigid support members have generally annular support surfaces to engage the gauging areas formed by the end surfaces of said tubular elements.

References Cited in the file of this patent

UNITED STATES PATENTS

| | | |
|---|---|---|
| 729,617 | Link | June 2, 1903 |
| 928,538 | Proffitt | July 20, 1909 |
| 2,049,732 | Blake | Aug. 4, 1936 |
| 2,435,858 | Whitehead | Feb. 10, 1948 |
| 2,445,141 | Hardy | July 13, 1948 |
| 2,556,335 | Moser | June 12, 1951 |
| 2,659,654 | Tuttle | Nov. 17, 1953 |
| 2,705,822 | Vennerholm | Apr. 12, 1955 |
| 2,720,687 | Shaw | Oct. 18, 1955 |
| 2,736,936 | Grueneberg et al. | Mar. 6, 1956 |

OTHER REFERENCES

Phenolic Resin Core Binders, Monsanto Chemical Co., Springfield, Mass. Page 5 relied on.

Bakelite Phenolic Resins, 1950 Union Carbide and Carbon Corp. Page 10 relied on.

Foundry, August 1950, Plastic Bonded Shell Molds. Pages 92, 96, 206, 209 relied on.

Steel, Dec. 3, 1951, Shell Mould, page 92 relied on.

Foundry Trade Journal, page 371, Sept. 17, 1953.

Fiat Report No. 1168, The "C" Process of Making Molds and Cores for Foundry Use. W. W. McCulloch, Office of Technical Services.